United States Patent [19]

Gibbons et al.

[11] Patent Number: 4,459,343

[45] Date of Patent: Jul. 10, 1984

[54] NONAQUEOUS ELECTROLYTE PHOTOELECTROCHEMICAL CELL

[75] Inventors: James F. Gibbons; George W. Cogan, both of Palo Alto; Christian M. Gronet, Stanford; Nathan S. Lewis, Palo Alto, all of Calif.

[73] Assignee: SERA Solar Corporation, Santa Clara, Calif.

[21] Appl. No.: 451,336

[22] Filed: Dec. 20, 1982

[51] Int. Cl.$^3$ .............................................. H01M 6/36
[52] U.S. Cl. .................................................... 429/111
[58] Field of Search ........................................ 429/111

[56] References Cited

PUBLICATIONS

R. J. Gale et al., "Electrolyte Properties For Photoelectrochemical Cells With Emphasis On The Molecular Adaptation of Metallocenes", *Solar Energy Mat'ls.*, vol. 4, pp. 135-149 (1981).
S. R. Morrison et al., "Photocorrosion In Solar Cells", Chapter 11 of *ACS Symposium Series No.* 146 (1981), A. J. Nozik, Editor.
M. J. Madov et al., "Photoelectrochemical Corrosion of Semiconductors For Solar Cells", *SPIE*, vol. 248, pp. 88-95 (1980).
Abstract No. 81, *J. Electrochem. Soc.*, vol. 126, Mar. 1979, p. 116c.
Kohl, P. A. and Bard, A. J., J. Am. Chem. Soc., 99, 7531 (1977).
Madou, M., Brondeel, Ph., Gomes, W. P., Hanselaer, P., and Cardon, F., Solar Energy Materials, 7, 33 (1982).
Nagasubramanian, G., Wheeler, B. L., Fan, F–R. F., & Bard, A. J., J. Electrochemical Soc., 129, 1742 (1982).
Aruchamy, A. and Wrighton, Mark S., J. Phys. Chem., 84, 2848 (1980).
Tanaka, S., Bruce, J. A., and Wrighton, Mark S., J. Phys. Chem., 85, 3778 (1981).
Dominey, R. N., Lewis, N. S., and Wrighton, Mark S., J. Am. Chem. Soc., 103, 1261 (1981).
Di Quarto, F. and Bard, A. J., J. Electroanal. Chem., 127, 43 (1981).
Bocarsly, A. B., Walton, E. G., Bradley, M. G. & Wrighton, M. S., J. Electroanal. Chem., 100, 283 (1979).
Frank, S. N. and Bard, Allen J., J. Am. Chem. Soc., 97, 7427 (1975).
Kohl, Paul A. and Bard, Allen J., J. Electrochem. Soc., 126, 598, 59, 603 (1979).
Legg, K. D., Ellis, A. B., Bolts, J. M. and Wrighton, M. S., Proc. Natl. Acad. Sci. USA, 74, 4116 (1977).
Bruce, J. A. and Wrighton, M. S., J. Electroanal. Chem., 122, 93 (1981).
Bookbinder, D. C., Lewis, N. S., Bradley, M. G., Bocarsly, A. B., & Wrighton, M. S., J. Am. Chem. Soc., 101, 7721 (1979).
Calabrese, G. S., Lin, M–S, Dresner, J. and Wrighton, M. S., J. Am. Chem. Soc., 104, 2412 (1982).
Avigal, Y., Cahen, D. Hodes, G., Manassen, J. and Vainas, B., J. Electrochem. Soc., 127, 1209 (1980).
Baglio, J. A., Calabrese, G. S., Kamieniecki, E., Kershaw, R., Kubiak, C. P., Ricco, A. J., Wold, A., Wrighton, M. S. and Zoski, G. D., J. Electrochem. Soc., 128, 1461 (1981).
White, H. S., Fan, F–R. F., and Bard, A. J., J. Electrochem. Soc., 128, 1045 (1981).
Nakatani, K., Matsudaira, S., and Tsubomura, H., J. Electrochem. Soc., 125, 406 (1980).
Fornarini, L., Stirpe, F., and Scrosati, B., J. Electrochem. Soc., 129, 1155 (1982).
Langmuir, M. E., Parker, M. A. and Rauh, R. D., J. Electrochem. Soc., 129, 1705 (1982).
Noufi, R., Tench, D. and Warren, L. F., J. Electrochem. Soc., 128, 2363 (1981).
Langmuir, M. E., Hoenig, P., and Rauh, R. D., J. Electrochem. Soc., 128, 2357 (1981).
Parkinson, Bruce, Solar Cells, 6, 177 (1982).

*Primary Examiner*—Aaron Weisstuch
*Attorney, Agent, or Firm*—Flehr, Hohbach, Test, Albritton & Herbert

[57] ABSTRACT

Solid-liquid interface photoelectrochemical cells are provided wherein the liquid phase comprises a nonaqueous solvent, an electrolyte dissolved therein forming an ionically conductive solution and a redox couple suitable to accept and donate electrons from and to the electrodes. The redox couple is present in an amount sufficient to sustain a predetermined current and the concentrations of the electrolyte and redox couple in the solution are sufficient to provide no greater than a selected small voltage drop relative to the output voltage of the cell. The efficiency of conversion of light to electrical energy of such photoelectrochemical cells are 10% and greater.

21 Claims, 8 Drawing Figures

Crystalline silicon
n-type
100 mW/cm$^2$ ELH input
Sample area: 1 cm$^2$
EFFICIENCY: 12%

NONAQUEOUS ELECTROLYTE PHOTOELECTROCHEMICAL CELL

The present invention relates to photoelectrochemical cells, and in particular, to nonaqueous liquid junction cells useful as solar cells.

In a cell utilizing a semiconductor-liquid junction, the liquid is an ionically conductive material. The analogy of the charge transfer phenomenon at the junction of the liquid with a solid semiconductor is the solid state Schottky barrier. In a semiconductor-liquid junction, the liquid plays the role of the metal overlayer in a classical Schottky barrier system. For example, if an n-type semiconductor is placed in contact with a liquid solution containing an electroactive species (i.e., a chemical redox couple) such that the redox potential of the electroactive species (the Fermi level) is more positive relative to vacuum than the conduction band of the semiconductor, charge transfer will take place until the equilibrium situation has resulted in a space charge layer of appreciable thickness (depletion region) in the semiconductor. The width of this depletion region, by analogy to the Schottky barrier systems, is related to the amount of band bending, the dopant density of the semiconductor and the dielectric constant of the semiconductor. The field created in the depletion region may be of a physical dimension such that it will be effective in separating photogenerated electron-hole pairs created by light absorption at the semiconductor-liquid interface. Therefore, if the semiconductor is an n-type, for example, photogenerated holes will be driven by the space charge field to the semiconductor surface toward the solid-liquid interface. The electrons will be driven into the bulk of the semiconductor. The holes will be consumed by electron donation from the electroactive species in the liquid (oxidation of the redox species), while the electrons can be withdrawn from the semiconductor, passed through a load, and reinjected into the liquid. If the injection of the electrons back into the liquid results by reduction of the redox species in the production of the same chemical species which was used to quench the photogenerated hole, then there will be no net chemical change in the liquid and the overall conversion will be light to electrical power. Depending upon the electroactive species present in the liquid, electrons may produce a different chemical species from that used to quench the photogenerated holes, in which case the cell may function as a battery in storing energy for later use.

It is therefore an object of the present invention to provide semiconductor-liquid junction photoelectrochemical cells which have improved efficiency.

It is a further object of the present invention to provide improved solar cells having improved solar to electrical energy conversion efficiency, usually in the range of 10% and above.

It is a further object of the present invention to provide thin layer liquid junction cells having improved solar-to-electrical energy conversions.

These and other objects will become apparent from the following descriptions and claims.

The present invention is directed to semiconductor liquid junction photoelectrochemical cells containing a nonaqueous solvent and an electrolyte which form an ionically conductive solution, and further containing a redox couple dissolved in the solution which is suitable to accept and donate electrons from and to the electrodes of the cell upon exposure of the cell by an external source of light. We have discovered that the redox couple should be present in an amount sufficient to sustain a predetermined current, and that the concentrations of the electrolyte and the redox couple in the solution must provide a small voltage drop compared to the output voltage. We have discovered further that by limiting the total water content in the solution, a liquid-insulator-semiconductor junction (LIS) may be formed which provides a photoelectrochemical cell which does not degrade over time. We have also discovered that by providing a thin liquid layer in a liquid junction cell, improved efficiency may be obtained without imposing mechanical stirring since diffusive conduction will be sufficient to conduct the charge.

According to the present invention, the efficiency of the photoelectrochemical cell may be improved by one or more of a combination of factors, including, minimization of the ohmic losses due to the liquid and solute components of the cell, and improvement of the mass and charge transfer processes at the solid liquid interface and in the solution.

Figure 1:
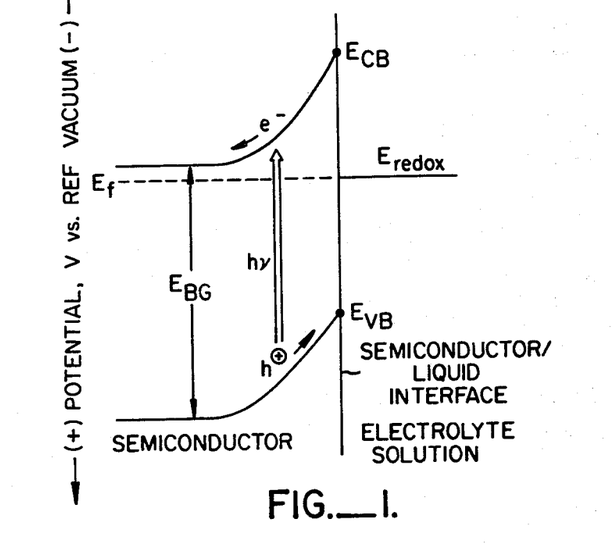
FIG. 1 shows the band diagram which characterizes a semiconductor-liquid junction.

The interface energetics, or band diagram, for an ideal semiconductor-liquid interface where the liquid contains a redox couple at charge transfer equilibrium is shown in FIG. 1. The vertical line represents the semiconductor electrolyte interface. The valence band edge and the conduction band edge of the semiconductor are denoted by $E_{VB}$ and $E_{CB}$, respectively. The band gap is indicated by the arrow $E_{BG}$, the potential of the redox couple by $E_{Redox}$ and the semiconductor Fermi level by $E_F$. The presence of a depletion layer in the semiconductor results in the separation of photogenerated electron-hole pairs ($e^-$, $h^+$), with the electrons being driven into the bulk (as shown, for an n-type semiconductor) and the holes migrating to the semiconductor liquid interface. The holes are consumed by a solution reductant, resulting in the flow of current. The voltage difference between the energy at the edge of the semiconductor conduction band, $E_{CB}$, and the redox potential, $E_{Redox}$, determines the barrier height of the cell. The band gap for semiconductor materials in solar cells is preferably 1.0 to 2.3 electron volts.

Figure 3:
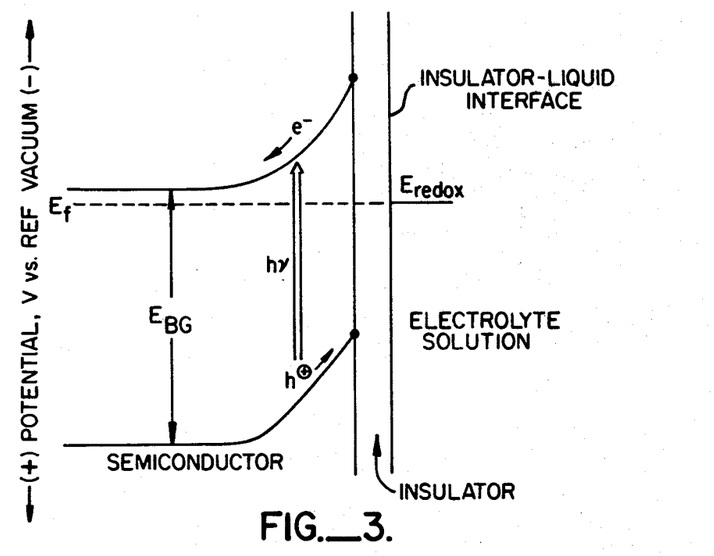
FIG. 3 shows the band diagram which characterizes a liquid-insulator-semiconductor (LIS) junction.

The band diagram for an LIS junction is shown in FIG. 3 for an n-type semiconductor. The insulator region may be a limited thickness, deliberately formed oxide layer resulting from the limitation of the total water content of the solution. The presence of such an oxide insulator layer may improve the short circuit current, $I_{sc}$, and open circuit voltage, $V_{oc}$, of the cell by acting as a barrier to majority carriers. The formal analysis of an LIS structure is analogous to the solid state treatment of an MIS structure.

The photoelectrochemical cells according to the present invention comprise a semiconductor photoactive electrode, a nonaqueous solvent containing a dissolved electrolyte forming an ionically conductive solution, a counter electrode providing an electrical connection from the solution to the photoactive electrode, and a redox couple dissolved in the solution which is suitable to accept and donate electrons from and to the electrodes upon exposure the cell by an external source of light, such as solar radiation.

The semiconductor photoactive electrode may comprise any semiconductor material, either n-type or p-type, which may be single crystal, polycrystalline, or amorphous. For example, a semiconductor material may be silicon, galium arsenide, gallium arsenide phosphide, cadmium telluride, cadmium selenide, or indium phosphide. Preferred semiconductor materials are silicon, gallium arsenide and gallium arsenide$_x$ phosphide$_{(1-x)}$, wherein x is between 0.2 and 1.0.

The solvent used in the liquid phase of the semiconductor liquid photoelectrochemical cells according to the present invention is nonaqueous. The nonaqueous solvent may be of the type which self-dissociates into solvent molecules which are ionically conductive or may be a solvent such that an electrolyte added thereto will be substantially dissociated to form an ionically conductive solution. To obtain optimum efficiencies of the cell, it is preferable that the solvent have a relatively high dielectric constant in order to achieve substantial dissociation of the electrolyte. Also, it is preferable that the solvent have a relatively low viscosity in order to facilitate mass transfer of the electrolyte ions through the liquid. Therefore, preferred solvents should have dielectric constants greater than about 20 and viscosities less than about 2 centipoise. A preferred class of solvents comprises the alkanols of 1 to 6 carbon atoms, particularly methanol. A second preferred class of solvents comprises nitriles of 2 to 6 carbon atoms, particularly acetonitrile. Generally, the solvent will be a matter of choice within the ordinary skill of those in the art, utilizing conventional tables of solvent viscosities and dielectric constants, such as, *Experimental Electrochemistry for Chemists*, Sawyer, Donald T., and Roberts, Julian L., Jr., John Wiley & Sons, New York (1974), Chapter IV. While the solvents utilized in accordance with the present invention are to be nonaqueous, conventional means of drying solvents may be utilized, with the realization that, in many instances, the solvent will not be absolutely free of water even after treatment with the drying agent or conditions. In the case of a silicon semiconductor, the reason for the removal of undesirable excess water from the solvent is to decrease the opportunity for electrode decomposition or passivation processes, which predominantly occur by oxide growth from the reaction of the semiconductor with residual water. If the oxide layer is too thick, it will completely insulate the semiconductor from the solution.

There is therefore a limit on the water content which should be permitted in the solvent in order to obtain long periods of operation of the cell without significant occurrence of passivation reactions involving water as a reactant. The number of permissible water molecules, n, in a given volume of solution, V, to insure that there is insufficient water present to form an insulating oxide layer on a semiconductor may be calculated. If there are $10^{16}$ molecules per centimeter square on the electrode surface, formation of 40 Å of oxide, or about 8 monolayers, would require $8 \times 10^{16}$ molecules of water per square centimeter of exposed electrode area. Assuming a rectangular geometry for the cell, either the thickness of the liquid, t, or the concentration of water, M, can be determined if the other is given, according to the following equation:

$$M < (8 \times 10^{16})/t\, N_A$$

$(N_A = 6.02 \times 10^{23})$

This equation should be general for any given volume and geometry of cell. Since according to conventional methods, it is unlikely that the solvent could be dried of water below about 0.01 ppm ($10^{-8}$ moles/liter or $6.02 \times 10^{17}$ molecules per liter), this places an upper limit on the volume of the nonaqueous solvent permitted to be in contact with the semiconductor. The restricted amount of water present in the solvent may be arranged to be sufficient to form a limited amount of oxide to create an LIS junction as shown in FIG. 3. Typically, the power output of a two-electrode LIS cell will not degrade substantially over time. For a silicon semiconductor, an oxide layer in the range of 20–40 Å is preferred for the LIS junction.

The electrolytes utilized in accordance with the present invention should be of the type which are substantially dissociated in the solvent to form an ionically conductive solution. Furthermore, the amount of electrolyte present is to be selected in an amount sufficient to provide no greater than a predetermined maximum electrical resistance due to the solution. The resistance of the nonaqueous solution, including the solutes dissolved therein, to current flow should be minimized in order to prevent large resistive losses. The electrolyte must therefore dissolve in the solvent and dissociate to yield conductive ions and must result in conductivities large enough to meet the resistivity specifications at the given concentration. Therefore, to predetermine the maximum desired resistance for the solution the following equation is utilized:

$$R = (\rho l / A)$$

where R is resistance and $\rho$ is the resistivity in ohm-cm. For example, at solar current densities, about 50 mA/cm$^2$, the voltage loss, IR, due to any particular solution resistance may be calculated. A typical cell may have an output voltage of around 0.50 volts. A predetermined limit for IR losses due to the solution may be selected to be 10% or less. Therefore, if the voltage loss is 0.05 V, and the current is 0.05 A/cm$^2$ R should be 1 ohm or less for a 1 cm$^2$ area. Use of the above equation relating R to solution thickness, l, results in the limit that $l\rho = 1$ will insure that the solution resistance will not be more than 10% of the 0.5 volt output voltage. Therefore if a cell thickness is specified, at 0.1 cm, the requirement would be a $\rho$ of less than 10 ohm-cm, which corresponds to a conductivity of greater than 100 mmho cm$^{-1}$. To meet these predetermined requirements, conventional tables of conductivities of ions in various solvents may be utilized, such as *Conductance of Electrolytes in Organic Solvents*, Kratochvil, B., and Yeager, Howard L., Fortsch, Chem. Forsch. Vol. 27, p. 1 (1972).

In methanol, a preferred electrolyte according to the present invention is lithium perchlorate because of its solubility and conductivity. In acetonitrile, the preferred electrolytes are the quaternary ammonium salts, particularly quaternary ammonium borontetrafluoride salts. A preferred electrolyte is tetraethyl ammonium borontetrafluoride.

The electroactive species, or redox couple, dissolved in the liquid in accordance with the present invention should have a redox potential such that it is suitable to accept and donate electrons from and to the electrodes in the cell upon exposure of the cell to an external source of light. The redox couple should be present in an amount sufficient to sustain a predetermined maximum current flux relative to the maximum photon flux of the incident light. Also, as a solute in the liquid, the redox couple should meet the limitations as to imparting no greater than a predetermined maximum electrical resistance due to the solution. However, in most circumstances the electrical resistance of the solution should be due primarily to the electrolyte and it will be normally sufficient to consider the current flux capability of the redox couple on the presumption that the solution resistance requirement can be satisfied by adjustment of the electrolyte concentration. During the operation of the cell there must be a steady state flux of redox molecules to the photoactive electrode surface in order to quench the photogenerated holes (in the case of an n-type semiconductor) or to quench the photogenerated electrons (in the case of a p-type semiconductor). The flux of redox molecules will depend upon whether natural diffusive convection is utilized in the solution or whether this is enhanced by agitation such as by thermal stirring, mechanical stirring, ultrasonic stirring and the like.

In a preferred embodiment of the present invention, the solution will present in the cell a thin layer, preferably having a thickness less than 100 microns, usually in the range of 10 to 100 microns. A cell having a thin solution layer is advantageous since the liquid volume between the electrodes is relatively small, therefore giving a higher permissible water concentration, wherein the limit of water present is determined as described above in connection with the formation of an LIS junction. Furthermore, the predetermined maximum permissible resistance of the solution may be satisfied by a thin layer, given that electrolyte conductivities are usually less than 100 mmho cm$^{-1}$. Additionally, mechanical stirring of a thin layer is not required since natural diffusion and thermal stirring caused by impingement of solar radiation on the solution will usually be sufficient. The rate of diffusion is characterized by the diffusion coefficient, D, of a molecular species in a particular solvent. The parameter D is typically $10^6$ cm$^2$ per second. In a thin cell, the relationship between the thickness of the solution and the concentration of redox species may be shown according to the theory presented in Bard et al., *Electrochemical Methods*, Bard, A. J., and Falkner, L. F. John Wiley & Sons, N.Y., 1980, by the following formula:

$$i_D = 2FDC_0/t$$

(F=9.65×10$^4$). Therefore, for a typical terrestrial sunlight intensity, the current density, $i_D$, is expected to be no greater than 50 mA/cm$^2$ for materials with band gaps greater than 1.0 eV. Assuming D=10$^{-6}$ cm$^2$ per second, the requirement is therefore that the ratio $C_0$ (concentration of electroactive species) to t (thickness)=260 or more in order to support the current flux by only natural diffusion. Therefore, if t is chosen to be 10 microns, then 0.25M of electroactive species will meet the current density requirement. In systems where t is much larger, either higher concentrations of electroactive species or forced convection will normally be utilized. Generally the current densities available from terrestrial sunlight assisted by mechanical stirring are in the order of 0.5 A/cm$^2$ at 1M concentration electroactive species. Therefore, to achieve greater than 50 mA/cm$^2$ it would require greater then 0.1M of electroactive species dissolved in a solution with efficient stirring. Since the current density requirement relates to both electrode surfaces, i.e., the surface of the semiconductor photoactive electrode and on the electrode providing a connection from the liquid to the load, the solubility limits of both the oxidized and the reduced forms of the redox couple must be separately considered, since the lower of the two values will limit the available current density.

The redox potential of the redox couple should be, in the case of n-type semiconductors, positive enough on the electrochemical scale to provide a substantial barrier height with the conduction bands of the n-type semiconductor. For p-type materials, the opposite is true, i.e., the redox species should have a redox potential which is electropositive in order to form a substantial barrier at the interface of the p-type semiconductor interface. The redox potentials of many classes of molecules are known in tabulations available to those of ordinary skill in the art and may be also be predicted based on molecular calculations or structural analogies to known molecules. Generally, for n-type semiconductor materials, redox couples which have redox potential more positive than −0.2 volts versus a saturated calomel electrode would be satisfactory. However, in the case of utilization with an n-type semiconductor if the redox couple is extremely oxidizable, it may react with the semiconductor in the dark as well as in the light, thereby causing corrosion.

Another property of the redox couple is that it should have a rate of electron transfer to the surface of the semiconductor rapid enough to allow significant current to flow. The theory which relates electron transfer rates at surfaces with molecular electron exchange rates is well known, such as described by R. A. Marcus. Many heterogenous rates for redox molecules are tabulated. Therefore, if the rates of electron transfer to and from the redox couple to the respective electrodes are too slow, the current flux will be limited not by the physical diffusion of the molecules to the electrode surface or by photon flux, but by the probability that a given redox molecule near the electrode surface will donate or receive charge to the electrode surface.

The preferred redox couples are ferrocene-ferrocenium couples, however, many redox couples may be selected which satisfy the above conditions. If the redox couple having an appropriate redox potential does not have the requisite solubility in the solvent of choice, then the redox couple may be chemically modified to impart greater solubility in the solvent. For example, the ferrocene molecule may be modified by introducing an alcohol side chain thereto according to conventional methods to make it more soluble in an alcohol solvent. In general, appropriate substituents may be introduced by known techniques to meet solubility requirements. Such substituents may include carboxylic acids, esters, amides, alcohol groups, amino groups, substituted amino groups, sulfoxy groups, ketones, phosphate groups and the like.

The solutes dissolved in the solution, i.e., the electrolyte and the redox species, should not appreciably absorb light in the wavelength regions which induce photogeneration at the semiconductor surface, if the configuration of the cell requires that the light pass through the solution in order to penetrate to the semiconductor. Generally, the solutes should not absorb light below the semiconductor band gap energy frequency or above wavelengths about 300 nm. In the case of silicon semiconductors, the solutes should not absorb light between about 1100 and 400 nm. If the solutes do absorb to an appreciable extent within an undesired region, proper concentration and solution thickness may be selected according to Beer's Law so that the absorbants do not substantially reduce efficiency of penetration of the light to the semiconductor surface. For example, according to Beer's Law the absorbance of a solution at a particular wavelength is defined by $A = elc$ where e is the molar extinction coefficient at the chosen wavelength, l is the path length of liquid in centimeters through which the light must pass, and c is the concentration of the absorbing molecule in moles/liter. Absorbance, A is related to transmittance, T, by the relationship $\log T = -A$. Therefore, A of 0.1 is equivalent to a transmittance at that wavelength of 0.8 (80%), and if this is chosen to be the minimum acceptable value, then to obtain $A=0.1$ with $c=0.1$ molar, el must equal 1 or less. Generally, the maximum values of e are in the order of $10^5$, usually between $10^2$ and $10^4$ for molecules which absorb in the visible wavelengths. If a typical value of e is chosen at $10^3$ then l should be less than $10^{-3}$ centimeters in order for the absorption by the solute to be acceptable within the predetermined limit (80%).

To further enhance the efficiency of the photoelectrochemical cells according to the present invention, it is desirable to etch a single crystal photoactive electrode surface to produce an increased surface area and to decrease reflectivity. Etching may increase the short circuit current by up to 50%. This treatment involves the use of etch solutions according to known techniques which preferentially etch particular crystal planes of the semiconductor, such as silicon.

For polycrystalline and amorphous semiconductors, etching may not be necessary. The first etch treatment of a single crystal semiconductor may also be followed by a second etch to remove oxide.

Figure 2:
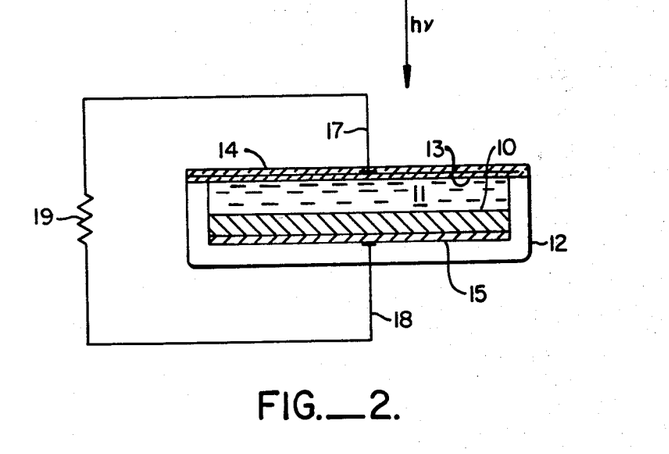
FIG. 2 is an elevational view of a semiconductor-liquid junction photoelectrochemical cell.

Referring to FIG. 2, there is shown a cross section of a photoelectrochemical cell according to the present invention. The semiconductor photoactive electrode 10 (n-type, as shown) and ionically conducting solution 11 containing electrolyte and redox species are contained within nonconductive casing 12, such as glass. Electrolyte solution 11 is in contact with transparent counterelectrode 13. A transparent sheet 14 overlays the cell and permits light to pass into the cell to contact the semiconductor 10. Current collector 15 is connected to lead 18. Leads 17 and 18 to the counterelectrode 13 and current collector 15, respectively, may be connected to a load 19 to perform work, or to a battery to store energy generated by the cell.

Having described particular embodiments, the following examples are set forth by way of illustration of the present invention.

The following examples fall into two distinct catagories: The two electrode and three electrode configurations. The two electrode configuration presents a prototype working cell and is represented in FIG. 2. The three electrode configuration requires the use of a reference electrode in addition to the working and counter electrodes. The general theory of this configuration is described in *Electrochemical Methods,* Bard, A. J. and Falkner, L. F., John Wiley & Sons, N.Y. 1980. An electronic feedback system is employed to compensate any limiting reaction or overpotential which occurs at the counterelectrode so that the electrochemistry of the working electrode may be isolated. Thus, in the case of an n-type semiconductor working electrode, the concentration of the oxidized form of the redox species (reduction occurs at the counterelectrode) may be artificially low. This configuration does not present a prototype working cell, but it is useful as a tool for study. And, as we will demonstrate in the following examples, a two electrode configuration of the same system, designed with the rules set forth above often leads to further increases in conversion efficiencies.

EXAMPLE 1

A 3-electrode LIS Cell With Single Crystal Silicon Semiconductor

Photoelectrochemical cells were constructed utilizing silicon electrodes fashioned from polished wafers of 1.3 to 1.7 ohm-cm resistivity, phosphorous-doped, (100) oriented single crystal material obtained from Monsanto Inc. Typical electrodes consisted of squares four millimeters on each side, rubbed on the unpolished side with Ga-In eutectic to form an ohmic contact. Shiny electrode surfaces were obtained by etching in concentrated (48%) aqueous HF for 20 seconds followed by a methanol rinse. The sample was then contacted, using silver epoxy, to a copper wire threaded through a glass rod. The backside and the front perimeter of the sample were coated with insulating epoxy to define the electrode area. Matte electrode surfaces were prepared by exposing unmounted silicon to Transene Corp., Rowley, Mass., Solar Cell Etchant type 200 for 60 minutes at 80 (°C.), and were mounted as in the case for shiny surfaces. The matte electrodes were etched with 48% HF and rinsed with methanol immediately before use. Methanol was Baker Chemical Company reagent grade, and was distilled under nitrogen from magnesium powder immediately before use. Lithium perchlorate, selected for its solubility in methanol, was obtained from Alfa Ventron Inc. and was used as received. Dry lithium perchlorate was obtained by fusion at 350 (°C.) for 24 hours under 0.01 mm Hg vacuum and was stored in a dry box until use. Ferrocene was obtained from Aldrich Chemical Company, and was purified by sublimation. Ferricenium+$PF_6^-$ was prepared by the method of Whal, *J. Am. Chem. Soc.* 79, 2049-2052 (1975), the disclosure of which is incorporated herein by reference in its entirety. (1-Hydroxy)ethylferrocene (hereinafter referred to as Fc-OH) was prepared by reduction of acetylferrocene (Aldrich) with LiAlH$_4$ according to the procedure of Arimoto, *J. Am. Chem. Soc.* 77, 6295-6297 (1955), and was dried in vacuo and stored under nitrogen. The ferricenium salt derivative (Fc+—OH) was prepared by electrochemical oxidation in methanol at +0.7 volts against a saturated calomel electrode (SCE) at a large area platinum electrode. A Luggin probe was fashioned from a borosilicate glass pipette and had a measured outer diameter 0.2 millimeters. The reference electrode (SCE) was connected to the cell by a salt bridge (1.0M lithium perchlorate in methanol) to the Luggin probe. For stability experiments, the SCE was replaced with a platinum wire reference electrode connected directly to the cell compartment. The counterelectrode was a large area (over 5 square centimeters) platinum electrode. The conductivity of 1.0M lithium perchlorate methanol solution was measured to be 35 mmho/cm. The light source was an ELH-type tungsten halogen bulb with a ground glass diffuser.

Figure 4:
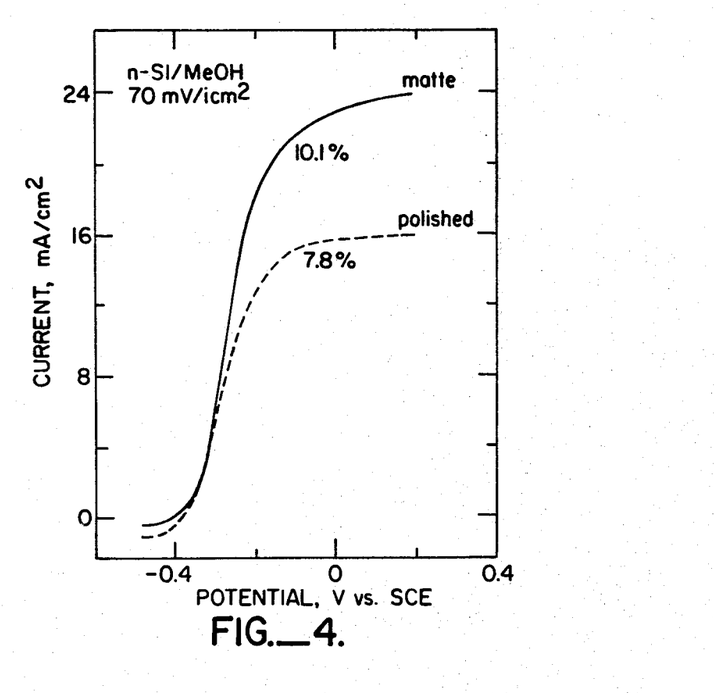
FIG. 4 shows the plot of current v. potential of a 3-electrode photoelectrochemical cell according to Example 1.

A cell was assembled containing (100) oriented n-type silicon electrodes in 1.0M lithium perchlorate/methanol with 0.2 molar Fc-OH, 0.5 mM Fc+—OH. The current voltage characteristic (50 mV/second) of the cell in response to light intensity of 70 mW/cm$^2$ from a calibrated solar simulator ELH-type tungsten halogen source is shown in FIG. 4. Efficiency of 10.1% was observed for the matte surfaced cells and 7.8% for the polished surface cells. Using the same ingredients of this 3-electrode cell, an analogous 2-electrode cell was constructed as set forth below in Example 2.

EXAMPLE 2

A 2-electrode LIS Junction Cell With Single Crystal Silicon Semiconductor

A thin cell was constructed in the following manner: The working electrode was fashioned from an n-type polished single crystal wafer with crystalline orientation (100) and resistivity 4–9 ohm-cm. First the same was oxidized in wet oxygen at 1100° C. to form a dense oxide on both sides of approximately 8000 Å in thickness. Then the perimeter of the sample was coated with positive photoresist to define an uncoated square area slightly larger than one square centimeter. After baking at 90° C. for 30 minutes (to harden the photoresist), the sample was etched for 12 minutes in semiconductor grade buffered oxide etch to remove the oxide in the defined square. Then the sample was treated in Transene solar cell etchant type 200 in the manner described in Example 1 to provide the defined area with a matte finish. An ohmic contact to the backside was made as described in Example 1, and immediately prior to use, the sample was etched in 1:10 HF:H$_2$O and rinsed in methanol.

The counter electrode was fashioned with indium tin oxide (ITO) coated glass obtained from OCLI having a sheet resistivity of approximately 10 ohms per square and an integrated transmission of 85–90%. First, two 0.5 mm holes were drilled in the ITO coated glass with an ultrasonic impact grinder made by Raytheon Corporation. Then four 0.25 square centimeter stainless steel masks were placed on the sample such that they defined a total area slightly larger than 1 square centimeter and equal to the area previously defined on the silicon electrode. A 150 Å layer of Ti (for its adhesion properties) followed by a 1000 Å layer of Au (for its conductive properties) were then evaporated in a filament evaporator at a pressure of 5×10$^{-6}$ torr. The removal of the masks left four 0.25 square centimeter transparent areas separated by two crossed grid lines of approximately 1 mm in width.

The working and counter electrodes were then clamped together and glued with 5 minute epoxy. Two syringe needles were epoxied into the holes in the ITO coated glass to provide a means for introducing the solution.

The contents of the solution were identical to whose used in Example 1, however, the concentrations were modified to suit the two electrode configuration using the conditions as set forth above. The solvent was methanol with 1.5M lithium perchlorate electrolyte, 0.12M Fc-OH and 0.16M Fc+—OH.

Figure 5:
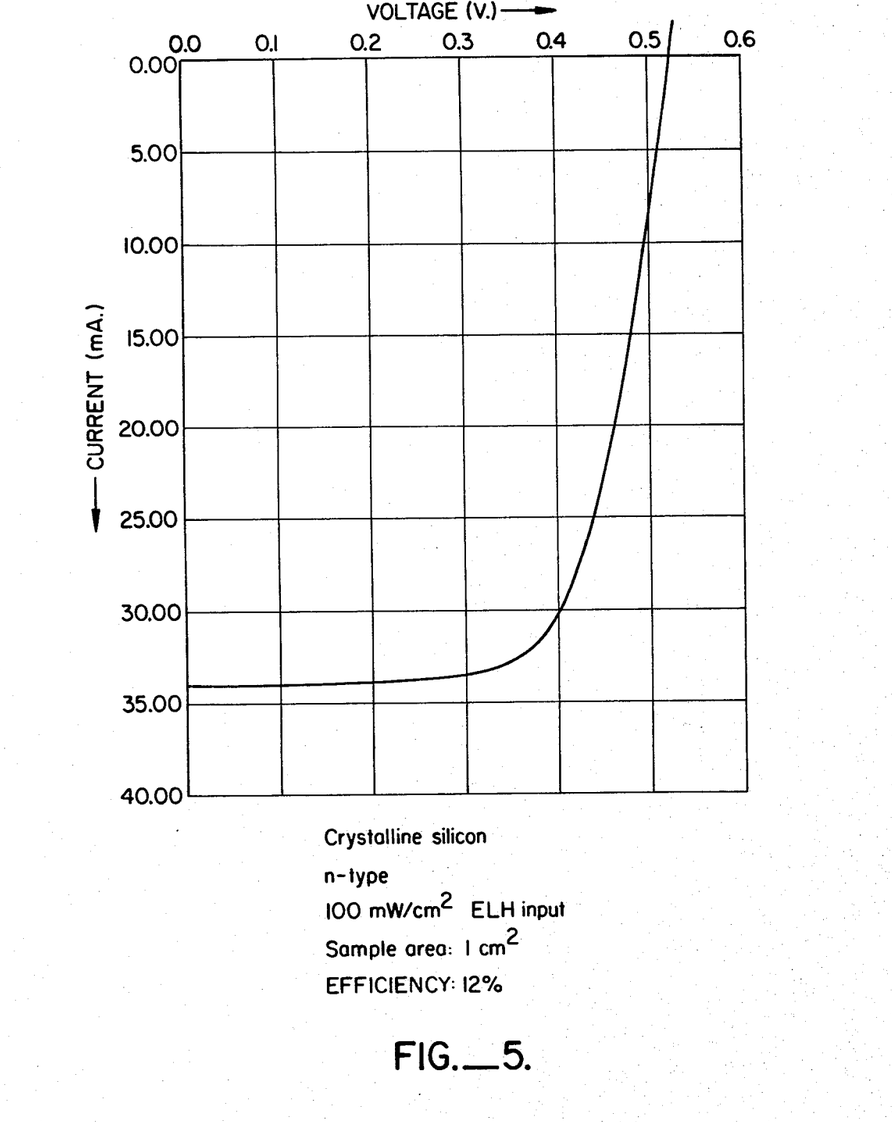
FIG. 5 shows the plot of current v. potential of a 2-electrode photoelectrochemical cell according to Example 2.
Figure 6:
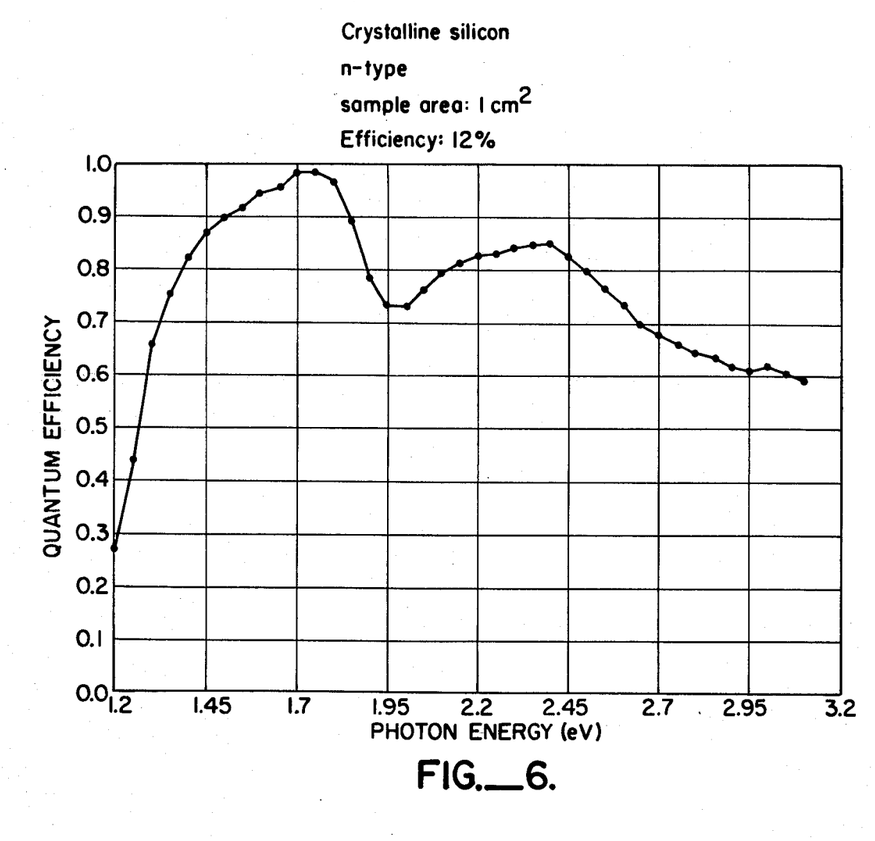
FIG. 6 is a plot of quantum efficiency v photon energy of a 2-electrode LIS cell according to Example 2.

Contact to the cell was accomplished with two standard probes and the cell was illuminated through the ITO coated glass with 100 mW/cm$^2$ ELH-type illumination as calibrated with a Solarex silicon standard. The current-voltage characteristic is shown in FIG. 5, and the spectral response curve is shown in FIG. 6. A conversion efficiency of 12% (with no correction for reflection or solution absorption) was obtained. From the Fc+—OH absorption (1.9 eV) in the spectral response curve (FIG. 6), the thickness of the liquid in the cell was deduced to be approximately 20 microns.

EXAMPLE 3

A 3-electrode Cell with n-GaAsP Epilayer Semiconductor

A semiconductor photoanode was prepared of the formula n-GaAs$_{0.72}$P$_{0.28}$ obtained as an epilayer deposited on n+-GaAs or n+-GaP substrate by vapor phase epitaxial techniques. The layer thickness was large enough (0.1 mm) such that no photoelectrochemical effects would be ascribable to the substrate material. Samples (0.1 cm$^2$) were mounted as photoelectrodes by forming ohmic contacts to the substrates by evaporation of In at 1×10$^{-6}$ torr and annealing them under nitrogen at 400° C. for 15 minutes. Samples were attached to a copper wire with silver paint and insulated with epoxy cement. Light sources utilized were either sunlight or a calibrated W-halogen ELH lamp with a ground glass diffuser. The samples were etched with 1:1 HF:HF$_2$O$_2$ for 15 seconds, rinsed with H$_2$O and air dried before use.

W-halogen irradiation (88 mW/cm$^2$) of a sample of n-GaAs$_{0.72}$P$_{0.28}$ (not deliberately doped; N$_D$=3.3×10$^{15}$) in a solution of 0.1M ferrocene (Fc), 0.5 mM ferricenium, (Fc+) in dry acetonitrile (ACN) solvent (electrolyte is 1.0M (C$_2$H$_5$)$_4$N+BF$^-_4$) produced an observed open circuit voltage of 1.01 volts and a short circuit current of 15.7 mA/cm$^2$ with a fill factor of 0.73, leading to an optical-to-electrical conversion efficiency of 13.2% (15.2 mA/cm$^2$ and 0.76 volt at the point of maximum power). In natural sunlight (64 mW/cm$^2$), we observe similar behavior, and conversion efficiencies of 12.5 to 13.0%.

EXAMPLE 4

A 3-electrode Cell With n-GaAs Semiconductor

Photoelectrochemical cells were prepared utilizing n-GaAs semiconductor electrodes in 0.1M ferrocene (Fc), 0.5 mM ferrocenium (Fc+) in acetonitrile and 1.0M [(C$_2$H$_5$)$_4$N]+[BF$_4^-$]. The n-GaAs samples (100) oriented, were etched with 1:1 H$_2$SO$_4$:H$_2$O$_2$ to a matte finish and mounted in a conventional cell as described above in connection with Example 3. Under 88 mW/cm$^2$ of ELH-type irradiation, an open circuit voltage of 0.7 volts with a short circuit current of 23.4 mA/cm$^2$, resulting in 8.9% efficiency for conversion of light to electricity, were observed. In direct sunlight similar behavior was observed and at irradiation levels of 65 mW/cm$^2$ 8.7% was observed to be the conversion efficiency of solar radiation into electricity.

EXAMPLE 5

A 3-electrode Cell With Single Crystal p-type Silicon

Electrodes were fashioned from 4–9 ohm-cm boron doped (100) oriented single crystal silicon obtained from Siltec. The preparation was identical to that described in Example 1 except that ohmic contact was made by evaporating 2000 Å of aluminum and sintering at 650 degrees centigrade for 15 minutes. A solution of 0.15M bis(cyclopentadienyl)cobalt perchlorate and 0.5 mM bis(cyclopentadienyl)cobalt was dissolved in acetonitrile with 1M tetraethylammonium boron terafluoride as electrolyte. The redox potential of the solution was −0.78 volts vs. SCE, as measured through a Luggin capillary vs. a platinum foil electrode.

A sample, mounted as described in Example 1 and measured to be 0.143 square centimeters in area, was etched in 48% HF for 15 seconds, rinsed with water, then with acetonitrile, air dried and inserted into a three electrode cell fitted with a Luggin capillary as described in Example 1. Under 88 mW/cm$^2$ of ELH illumination, we observe an open circuit voltage of 0.49 V, a short circuit current of 26 mA/cm$^2$ and a conversion effficiency of 6%. It is predicted that this result will be improved with the addition of a matte etch to the surface treatment and further improved in a two electrode configuration similar to that described in Example 2.

EXAMPLE 6

A 3-electrode LIS Cell With Amorphous Silicon Semiconductor

A layer of amorphous silicon was deposited by rf plasma decomposition on a stainless steel substrate. A 100 Å layer of phosphorous doped amorphous silicon followed by a 0.5 micron layer of intrinsic amorphous silicon characterized the deposition. The backside was contacted with a copper wire threaded through a glass rod. An electrical connection to the backside was made with silver epoxy and then the electrode was attached to the rod with insulating epoxy. At the same time, the backside and the perimeter of the front side were also covered with insulating and opaque epoxy to define the electrode area. The area was measured to be 0.28 square centimeters.

The solution used in this cell had the same ingredients as described in Example 1. The solution was methanol with 1M lithium perchlorate and the redox pair was 0.15M Fc-OH, 0.5 mM Fc$^+$—OH. A Luggin capillary was used to minimize uncompensated resistance. At 70 mW/cm$^2$ ELH-type illumination there was observed a short circuit current of 2.7 mA/cm$^2$ and an open circuit voltage of 0.72 volts with a conversion efficiency of 1.3%. The low current values were attributed to solution absorption.

EXAMPLE 7

A 2-electrode LIS Cell With Amorphous Silicon Semiconductor

A thin layer of amorphous silicon was deposited by rf plasma decomposition on a degenerately doped n-type single crystal silicon substrate. A 1000 Å layer of n+ amorphous silicon followed by a 0.5 micron layer of intrinsic amorphous silicon characterized the deposition. An ohmic back contact was accomplished as in Examples 1 and 2 with Ga-In eutectic. The counter electrode was fashioned with ITO coated glass supplied by OCLI having the characteristics described in Example 2. As in Example 2, first two holes were ultrasonically drilled in the ITO coated glass. Then the glass was masked with a square silicon slice of area 0.065 square centimeters. The masked glass was placed in a filament evaporator and, at a system pressure of 5×10$^{-6}$ torr, 5000 Å of aluminum was evaporated onto it. A larger square silicon mask of area 0.15 square centimeters was then placed on the ITO coated glass and the region surrounding the mask was coated with an 8000 Å insulating film of chemical-vapor-deposited SiO$_2$. The counter electrode and the working electrode were then clamped together and epoxied (as in Example 2). The solution, identical to the one in Example 2, was introduced by means of syringes which were epoxied to the previously drilled holes.

Figure 7:
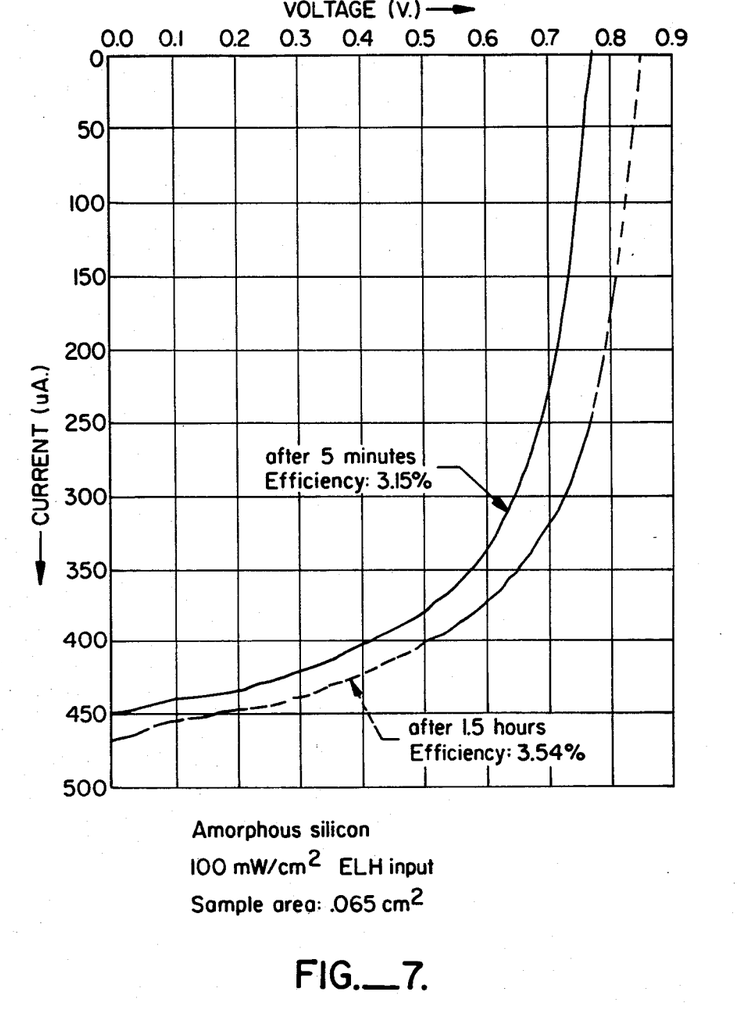
FIG. 7 is a plot of power curve v. time of a 2-electrode LIS cell according to Example 7.

A conversion efficiency of 3.1% was observed under 100 mW/cm$^2$ of ELH-type irradiation. As shown in FIG. 7, there was observed an increase in efficiency after the cell was held at maximum power for approximately 1.5 hours. Open circuit voltage increased from 0.77 volts to 0.85 volts while short circuit current increased from 6.9 mA/cm$^2$ to 7.2 mA/cm$^2$. The corresponding increase in efficiency was from 3.1% to 3.5%. The increase in efficiency was attributed to the formation of an optimized thickness of oxide on the working electrode surface which creates the optimized LIS structure discussed in this application. It was noted that the characteristics of the amorphous silicon used were less than optimal. It is expected that a reflecting substrate and an optimized thickness will yield a dramatic improvement in conversion efficiency.

EXAMPLE 8

A 2-electrode Cell With n-type Polycrystalline Silicon Semiconductor

Samples of n-type polycrystalline silicon were obtained from Wacker Siltronic. The samples were characterized by a resistivity of 1–3 ohm-cm and a preferred crystal orientation of (100). They were diced into one square centimeter squares with a diamond saw, then treated for 1.5 hours in the Transene matte etch under the conditions described in Example 1. Following the matte etch a sample was further etched in 10:1 H$_2$O:HF for 10 minutes and rinsed in H$_2$O. A square mask of approximate area 0.36 square centimeters was then placed in the center of the sample and the sample was covered with a 7000 Å insulating layer of chemical-vapor-deposited SiO$_2$. Upon removal of the mask, a working electrode with a bare silicon area surrounded by an insulating oxide was obtained. Ohmic contact to the backside was made with gallium indium eutectic as in Example 2.

The counter electrode was fashioned with ITO coated glass in the general manner described in Example 2; however, only one masking square was used, and the resulting cell area was therefore 0.25 square centimeters.

After a 30 second etch in 10:1 H$_2$O:HF followed by a methanol rinse the working electrode was clamped to the counter electrode and epoxied. As in Example 2, syringe needles were epoxied to holes in the ITO coated glass, and the solution was introduced. The solution was identical to the one described in Example 2.

Figure 8:
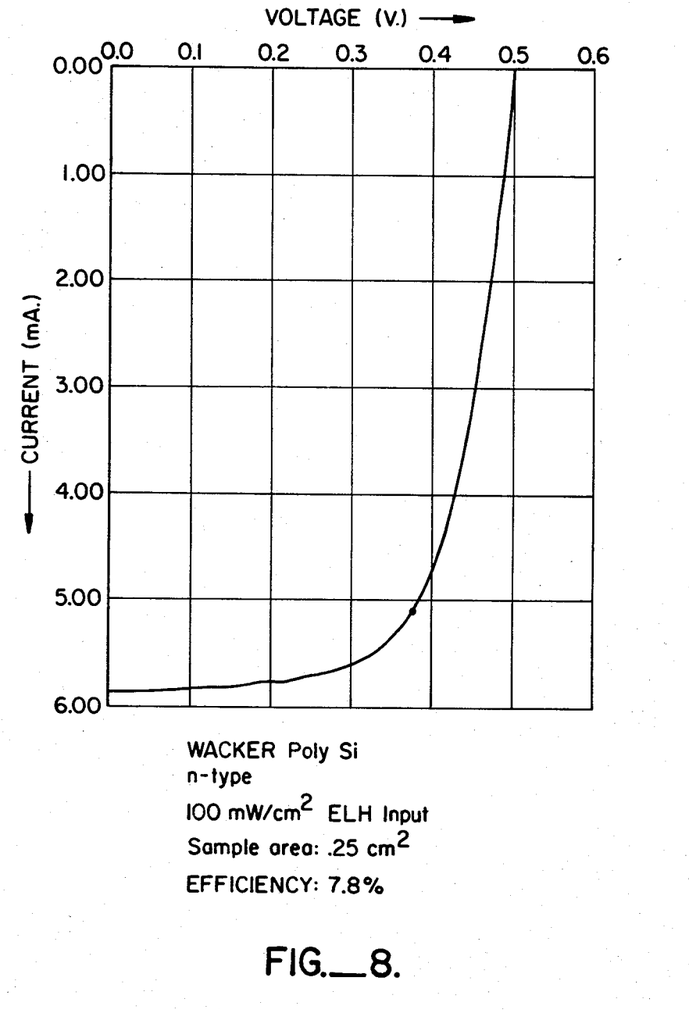
FIG. 8 shows the plot of current v. potential of a 2-electrode LIS cell according to Example 8.

In FIG. 8, the current voltage characteristics of this cell are presented. Under 100 mW/cm$^2$ of ELH illumination a conversion efficiency of 7.8% was observed.

What is claimed:

1. A photoelectrochemical cell having a solar energy conversion efficiency in the range of about 10% and above, comprising a semiconductor photoactive electrode, a nonaqueous solvent and an electrolyte dissolved therein forming an ionically conductive solution, a counterelectrode providing an electrical connection from said solution to said photoactive electrode; and a redox couple dissolved in said solvent suitable to accept and donate electrons from and to said electrode upon said cell by an external source of light, said redox couple present in an amount sufficient to sustain a predetermined current; wherein the concentration of said electrolyte and said redox couple in said solution are selected to provide a voltage drop substantially less than the output voltage of said cell during conversion in said cell of said light to electricity.

2. A cell according to claim 1 wherein said solvent further comprises an agent which induces formation of a predetermined amount of an insulating compound at the interface of said semiconductor electrode and said solution.

3. A cell according to claim 2 wherein said agent is water and said semiconductor comprises silicon.

4. A cell according to claim 1 wherein said semiconductor is an n-type.

5. A cell according to claim 1 wherein said semiconductor is a p-type.

6. A cell according to claim 5 wherein said semiconductor comprises p-silicon.

7. A cell according to claims 4 or 5 wherein said solution is a liquid film of a thickness less than 100 microns.

8. A cell according to claims 4 or 5 wherein the band gap of said semiconductor is in the range of 1.0 to 2.3 eV.

9. A cell according to claim 8 wherein said semiconductor is selected from the group consisting of silicon, gallium arsenide, gallium arsenide phosphide, cadmium telluride, cadmium selenide and indium phosphide.

10. A cell according to claim 9 wherein said semiconductor is selected from silicon, GaAs and GaAs$_x$P$_{1-x}$, wherein x is between 0.2 and 1.

11. A cell according to claim 9 wherein said semiconductor comprises cadmium telluride.

12. A cell according to claims 4 or 5 wherein said semiconductor is amorphous.

13. A cell according to claim 1 wherein said nonaqueous solvent is characterized by a dielectric constant greater than 20 and a viscosity less than 2 centipoise.

14. A cell according to claim 13 wherein said solvent is selected from an alkanol of 1 to 6 carbon atoms or a nitrile of 2 to 6 carbon atoms.

15. A cell according to claim 14 wherein said solvent is selected from methanol or acetonitrile.

16. A cell according to claim 13 wherein said electrolyte is selected from lithium perchlorate and tetra alkyl ammonium borontetrafluoride.

17. A cell according to claim 1 wherein said redox couple is selected from ferrocene-ferrocenium salts and derivatives thereof.

18. A cell according to claims 5, 11, 15 or 17 wherein said electrolyte is lithium perchlorate, said solvent is methanol, said redox couple is (1-hydroxyethyl)ferrocene/(1-hydroxyethyl)ferrocenium salt, and said semiconductor is n-type silicon.

19. A cell according to claims 5, 16, 15 or 17 wherein said electrolyte is tetraethyl ammonium borotetrafluoride, said solvent is acetonitrile, said redox couple is ferrocene/ferrocenium salt and said semiconductor is an epitaxial layer of GaAs$_{0.72}$P$_{0.28}$ on a GaAs substrate.

20. A cell according to claims 5, 16, 15 or 17 wherein said solvent is acetonitrile, said redox couple is ferrocene/ferrocenium salt, said electrolyte is tetraethyl ammonium borontetrafluoride and said semiconductor n-GaAs.

21. A cell according to claim 1 wherein the predetermined current is the solar photon flux with energies greater than the bandgap of the photoactive electrode multiplied by the charge of an electron.

* * * * *